US009152828B2

(12) United States Patent
Goncalves et al.

(10) Patent No.: US 9,152,828 B2
(45) Date of Patent: Oct. 6, 2015

(54) SYSTEM AND METHOD FOR PREVENTING CASHIER AND CUSTOMER FRAUD AT RETAIL CHECKOUT

(71) Applicant: Datalogic ADC, Inc., Eugene, OR (US)

(72) Inventors: Luis Goncalves, Pasadena, CA (US);
Justin Beghtol, Santa Ana, CA (US);
Isaac Gremmer, San Gabriel, CA (US);
Jim Ostrowski, Pasadena, CA (US)

(73) Assignee: Datalogic ADC, Inc., Eugene, OR (US)

( * ) Notice: Subject to any disclaimer, the term of this patent is extended or adjusted under 35 U.S.C. 154(b) by 72 days.

(21) Appl. No.: 13/903,863

(22) Filed: May 28, 2013

(65) Prior Publication Data

US 2014/0014722 A1    Jan. 16, 2014

Related U.S. Application Data

(63) Continuation of application No. 12/554,630, filed on Sep. 4, 2009, now Pat. No. 8,448,859.

(60) Provisional application No. 61/191,165, filed on Sep. 5, 2008.

(51) Int. Cl.
| | |
|---|---|
| *G06K 15/00* | (2006.01) |
| *G06K 5/00* | (2006.01) |
| *G06K 9/00* | (2006.01) |
| *G07G 1/00* | (2006.01) |
| *G07G 3/00* | (2006.01) |
| *G08B 13/24* | (2006.01) |

(52) U.S. Cl.
CPC .............. *G06K 5/00* (2013.01); *G06K 9/00771* (2013.01); *G07G 1/0054* (2013.01); *G07G 3/003* (2013.01); *G08B 13/248* (2013.01)

(58) Field of Classification Search
USPC ................................ 235/383, 462.01, 462.41
See application file for complete search history.

(56) References Cited

U.S. PATENT DOCUMENTS

| | | | |
|---|---|---|---|
| 5,883,968 A | 3/1999 | Welch et al. | |
| 6,427,915 B1 * | 8/2002 | Wike et al. | ..................... 235/383 |
| 6,711,293 B1 | 3/2004 | Lowe | |
| 7,118,026 B2 | 10/2006 | Harris et al. | |
| 7,242,300 B1 | 7/2007 | Konstad et al. | |
| 7,246,745 B2 | 7/2007 | Hudnut et al. | |

(Continued)

OTHER PUBLICATIONS

Bay et al., "SURF: Speeded Up Robust Features. Proceedings of the Ninth European Conference on Computer Vision," May 2006.

(Continued)

*Primary Examiner* — Daniel Hess
(74) *Attorney, Agent, or Firm* — Stoel Rives LLP (57) ABSTRACT

Systems and methods for preventing fraud during retail checkout are described. A system includes: item identifier acquisition devices to acquire identifiers (e.g., barcodes) of items to be transacted; cameras or imagers to acquire images of the items to be transacted; an object recognition component to perform visual recognition of the acquired items through comparison of the acquired images of the items with a database and obtain identifiers of items represented in the database that correspond to an acquired image according to a correspondence criterion; a comparison component to compare a set of identifiers acquired through the item identifier acquisition devices with a set of identifiers obtained through the object recognition component; and an alerting component to provide an alert in case of discrepancies between the two sets.

19 Claims, 7 Drawing Sheets

(56) References Cited

U.S. PATENT DOCUMENTS

| | | |
|---|---|---|
| 7,267,282 B2 | 9/2007 | Zhu et al. |
| 7,337,960 B2 | 3/2008 | Ostrowski et al. |
| 7,448,542 B1 | 11/2008 | Bobbitt et al. |
| 7,503,490 B1 | 3/2009 | Bobbitt et al. |
| 7,631,808 B2 | 12/2009 | Kundu et al. |
| 7,646,887 B2 | 1/2010 | Goncalves et al. |
| 8,068,674 B2 | 11/2011 | Goncalves |
| 8,267,316 B2 | 9/2012 | Ostrowski et al. |
| 8,448,859 B2 | 5/2013 | Goncalves et al. |
| 2005/0189412 A1* | 9/2005 | Hudnut et al. ............... 235/383 |
| 2006/0147087 A1 | 7/2006 | Goncalves et al. |
| 2006/0261157 A1 | 11/2006 | Ostrowski et al. |
| 2006/0283943 A1 | 12/2006 | Ostrowski et al. |
| 2007/0057049 A9 | 3/2007 | Kundu et al. |
| 2009/0026270 A1* | 1/2009 | Connell et al. ........... 235/462.41 |
| 2009/0060259 A1 | 3/2009 | Goncalves |

OTHER PUBLICATIONS

Fan et al., "Recognition of Repetitive Sequential Human Activity," IBM Technical Report, 2009.

\* cited by examiner

SYSTEM AND METHOD FOR PREVENTING CASHIER AND CUSTOMER FRAUD AT RETAIL CHECKOUT

RELATED APPLICATIONS

The present application is a continuation of U.S. patent application Ser. No. 12/554,630, filed Sep. 4, 2009; which claims priority benefit of U.S. Provisional Application No. 61/191,165, filed Sep. 5, 2008. Each aforementioned application is incorporated herein by reference in its entirety.

TECHNICAL FIELD

The present disclosure relates to detection systems and methods. In particular, it relates to detection systems and methods based on object recognition. More in particular, it relates to a system and method for preventing cashier fraud (e.g., collusion, sweethearting, scan passing), customer fraud (e.g., UPC substitution), and accidental loss during retail checkout.

BACKGROUND INFORMATION

Sweethearting, in the realm of retail checkout systems, is the giving of unauthorized discounts or the abetting of shoplifting or other theft. Scan passing is a particular form of sweethearting where the cashier moves an item from the delivery belt to the bagging area without scanning the item with a barcode scanner (typically built into the checkout counter) so as to avoid the inclusion of the item in the customer's ring-up list of items to pay for.

A first technique for preventing fraud during retail checkout is scan gap detection, where longer-than-usual delays between successive UPC barcode scans are detected (based on the assumption that an efficient cashier scans items quickly at a fast and steady pace, and if scan passing fraud occurs, that rhythm is broken). Such technique generates too many false positives, thus requiring a high amount of time to review the exceptions thus generated.

A second technique is based on tracking items from belt to bag or bagging area. Such technique is unreliable, because it needs human presence in the loop to perform detections of fraud. Additionally, it is difficult to track all items without creating many mistakes.

SUMMARY

According to a first aspect, a detection method is provided comprising: acquiring first identifiers of items to be transacted during retail checkout; acquiring images of the items to be transacted during retail checkout; comparing the acquired images with a database of item information to obtain presence or absence of second identifiers of items associated with the acquired images; and detecting differences between a set of said first identifiers and a set of said second identifiers by comparing presence or absence of the first identifiers with the presence or absence of the second identifiers, wherein the detecting is adapted to be performed identifier by identifier and between the sets as a whole.

According to a second aspect, a detection system is provided, comprising: one or more item identifier acquisition devices to acquire identifiers of items to be transacted; one or more cameras or imagers to acquire images of the items to be transacted; an object recognition component to perform visual recognition of the acquired items through comparison of the acquired images of the items with a database of item information and obtain identifiers of one or more items represented in the database of item information that correspond to an acquired image according to a correspondence criterion; a comparison component to compare a set of identifiers acquired through the one or more item identifier acquisition devices with a set of identifiers obtained through the object recognition component to detect, identifier by identifier or between the sets as a whole: i) match or mismatch between the identifiers acquired through the one or more item identifier acquisition devices and the identifiers obtained through the object recognition component, and ii) absence of identifiers acquired through the one or more item identifier acquisition devices when identifiers obtained through the object recognition component are present; and an alerting component to provide an alert in case of discrepancies between the set of identifiers acquired through the one or more item identifier acquisition devices and the set of identifiers obtained through the object recognition component.

According to a third aspect, a detection system is provided, comprising: an object recognition component to perform visual recognition of images of items to be transacted through comparison of acquired images of the items with a database of item information and obtain identifiers of one or more items represented in the database of item information that correspond to an acquired image according to a correspondence criterion; a comparison component to compare a set of identifiers acquired through one or more item identifier acquisition devices with a set of the identifiers obtained through the object recognition component to detect, identifier by identifier or between the sets as a whole: i) match or mismatch between the identifiers acquired through the one or more item identifier acquisition devices and the identifiers obtained through the object recognition component, and ii) absence of identifiers acquired through the one or more item identifier acquisition devices when identifiers obtained through the object recognition component are present: and an alerting component to provide an alert in case of discrepancies between the set of identifiers acquired through the one or more item identifier acquisition devices and the set of identifiers obtained through the object recognition component.

According to a fourth aspect, a detection system is provided, comprising: a comparison component to compare a set of identifiers of items to be transacted acquired through one or more item identifier acquisition devices with a set of identifiers obtained through visual recognition of images of the items to be transacted to detect, identifier by identifier or between the sets as a whole: i) match or mismatch between the identifiers acquired through the one or more item identifier acquisition devices and the identifiers obtained through the object recognition component, and ii) absence of identifiers acquired through the one or more item identifier acquisition devices when identifiers obtained through the object recognition component are present; and an alerting component to provide an alert in case of discrepancies between the set of identifiers acquired through the one or more item identifier acquisition devices and the set of identifiers obtained through the visual recognition.

Therefore, in accordance with embodiments of the present disclosure, each item is visually recognized independent of whether it has been successfully scanned by the cashier or not.

In particular, discrepancies between visually recognized items and scanned items are detected. Such discrepancies can include visually recognized items without an associated UPC (Universal Product Code) scan (scan passing) and visually recognized items for which the UPC scan does not correspond to an item package (UPC substitution fraud where a customer purposefully replaces a UPC barcode of an expensive item with the UPC barcode of a less expensive item).

In accordance with some of its embodiments, the present disclosure is also able to monitor a subset or predetermined class of items sold at a retail facility (e.g., high value items, or high loss items) without needing to monitor and account for all items in a transaction. This may be beneficial because it may reduce the effort needed to maintain a database of visual recognition models (described later) up-to-date, and may reduce the amount of processing and number of false positives that can occur.

Additionally, the method and system of the present disclosure can be fully automatic, operate in real-time and generate alerts in real-time. If desired, locking the point of sale can be enabled to prevent the transaction from being completed and the customer leaving without the cashier or a manager first addressing the detected fraud event, without causing an unacceptable number of false alerts and lock-ups.

DESCRIPTION OF EXAMPLE EMBODIMENTS

Figure 1:
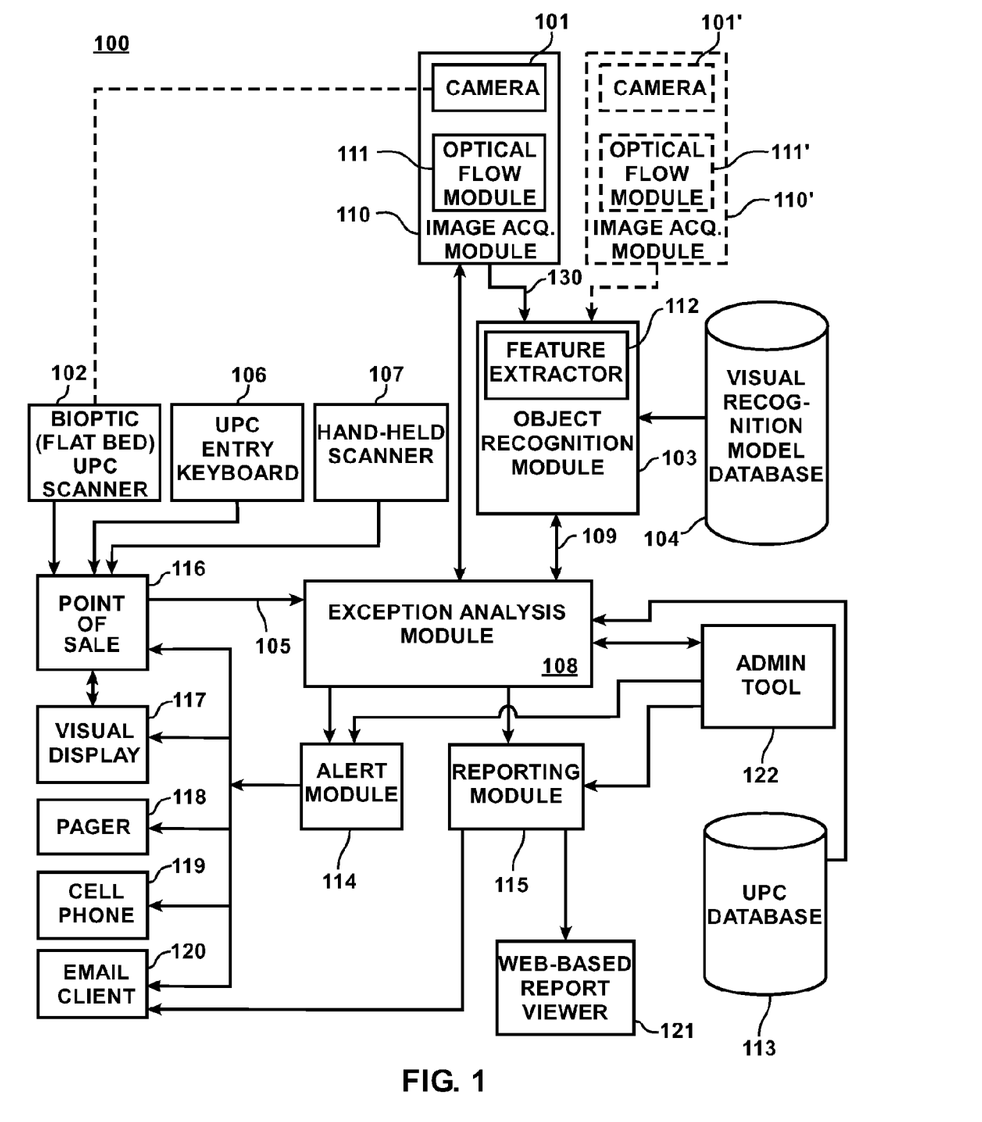
FIG. 1 shows a diagram of the system and method according to the present disclosure.

An embodiment of the system and method of the present disclosure is shown in the diagram of FIG. 1, where a system (100) for preventing cashier and customer fraud at retail checkout is shown.

One or more cameras (101, 101') in a checkout station are placed within or nearby an item identifier acquisition device, e.g., a bi-optic (flat-bed) barcode scanner (102), so as to acquire images of items that the cashier attempts to scan. Scanner (102) can be a standard UPC scanner (usually with weight scale) that contains two or more laser-based barcode readers (typically forward facing, and upward facing readers). Some scanner models may already incorporate 2D imagers to do barcode scanning instead of laser-based readers. In such cases, the same imager can be used instead of the cameras (101, 101') for visual object recognition. See, for example, U.S. Patent Application Publication No. 2005/0116041, which is incorporated herein by reference in its entirety.

Figure 3:
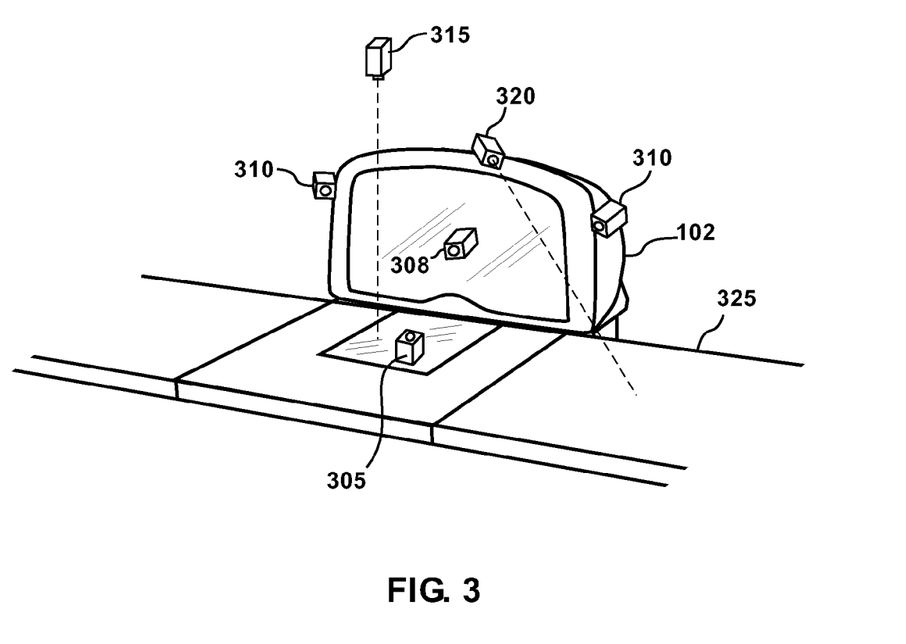
FIG. 3 shows examples of camera placement within or nearby a barcode scanner.

FIG. 3 shows examples of camera placement within or nearby barcode scanner (102) in accordance with embodiments of the present disclosure. The area imaged is wide enough to image an item even if the cashier attempts to bypass the scanner (102). The resolution of the camera is such as to enable visual recognition of the items by an object recognition module, later described. The camera can be a monochrome or color camera, providing a high frame rate of images (for example, at a rate of 30 frames per second) to the later described optical flow module. The camera can use, for example, either a CMOS or CCD sensor. Typically, a resolution of 640×480 pixels is sufficient for successful object recognition.

The placement of cameras can include: a camera (305) within the bi-optic scanner facing towards the cashier; a camera (308) within the bi-optic scanner facing upwards; cameras (310) within the scanner or on the periphery or sides of the scanner to provide images suitable for stereo image processing (to compute 3D position and/or depth of objects if desired); an overhead camera or cameras (315) looking down at the area of the bi-optic scanner; or a camera (320) aimed at the supply belt (325) where a customer places items for scanning by the cashier, or aimed at any other location where a clear view of all items to be processed in a transaction can be obtained.

Turning to the diagram of FIG. 1, according to an embodiment of the present disclosure, the camera (101, 101') triggers image capture based on motion detection and/or optical flow analysis of a video stream or sequence of images to select images salient to the items to be transacted, e.g., purchased, and to separate images pertaining to one item from images pertaining to another item. An example of such method is described in U.S. Patent Application Publication No. 2006/0147087, titled "Optical flow for object recognition", which is incorporated herein by reference in its entirety.

As shown in FIG. 1, occurrence of optical flow analysis is shown by the presence of an optical flow module or object tracking module (111, 111') associated with the camera (101, 101') in an image acquisition module (110, 110'). The optical flow module (111, 111') is configured to provide images to the object recognition module (103), described below.

During operation of the system (100), the optical flow module (111, 111') tracks the motion of objects in the image. The optical flow module (111, 111') usually receives images from the camera (101, 101') at a high frame rate, and selects a subset of images, with a correspondingly lower frame rate, to send to the object recognition module (103). The optical flow module (111, 111') can spatially sample the moving object (in cases where the object is larger than the field of view of the camera) to guarantee that the entirety of an object is viewed, thus enhancing the reliability of the object recognition module (103). The optical flow module (111, 111') can also keep track of the persistence of objects in view reporting to the object recognition module (103) and/or the exception analysis module (108) (discussed below) which selected images belong to the same tracked object.

In particular, embodiments of the present disclosure can provide for optical flow modules (111, 111') having one or more of the following features:

i) tracking the motion of items in the field of view. Incidentally, it should be noted that while U.S. Patent Application Publication No. 2006/0147087 describes a procedure for tracking 1D (horizontal) motion, the procedure can be modified to track motion in two dimensions, thus being able to handle arbitrary translations within the image;

ii) triggering an image capture to be sent to the later described object recognition module (103). In some embodiments, it can be desirable to limit the rate at which images are sent to the object recognition module (103), so as to not overload the processor. This can be done by spatially sampling the moving object; an image trigger occurs whenever the object moves a certain fraction of the image width;

iii) keeping track of whether the same object is in the field of view, or a new one has appeared. This can be done, for example, by processing images at a high frame rate (for example, 30 frames per second), and keeping track of the centroid of the motion. As long as the centroid moves in a continuous fashion from frame to frame, the same object is in view. When the centroid suddenly moves from one location of the image to another (typically from the edge of the image closer to the bagging area to the edge of the image closer to the conveyor belt area), then a new object has entered into view;

iv) tagging each visual recognition (and UPC scan) that occurs during the tracking of a single physical item with the same unique item count ID or group ID.

Alternate methods of object tracking (111, 111') suitable for the present disclosure can include:

i) image sub-block correlation approach, as also mentioned in U.S. Patent Application Publication No. 2006/0147087;

ii) tracking specific keypoints in the image;

iii) "Blob" tracking, with or without the use of a color camera, where background subtraction can be used to identify novel foreground elements, and the motion is tracked by estimating a blob (often an elliptical model) size and center to cover the foreground, updating the estimates from frame to frame;

iv) detecting blobs via an image differencing approach, where sequential frames are image with and without a controlled lighting, so that nearby foreground objects appear as bright blobs in the image difference between images with and without light. The blob center and size can again be estimated and updated from frame to frame;

v) use a stereo pair of cameras to estimate object depth using stereo imaging techniques, and tracking the center and size of objects in 3D (cameras (310) in FIG. 3).

A further embodiment of an object recognition module (111, 111') suitable to be applied to the present disclosure is described in U.S. Patent Application Publication No. 2009/0060259, titled "UPC substitution fraud prevention", which is hereby incorporated by reference herein.

The steps involved for object recognition in the above incorporated disclosure are:

1) extracting geometric point features from the image by:
   1.a) using a detector such as difference-of-gaussians, Harris-Laplace detector, or Hessian-Laplace detector, which can reliably detect point features in a way that is invariant to rotation or scale; or
   1.b) using a feature descriptor to encode a unique descriptor (vector) that describes the appearance of the feature (the appearance of the pixels nearby the detected point feature) in a scale and rotation invariant way. Such a descriptor has the property that descriptors of the corresponding features from multiple views of the same object are similar (in the sense of having a small Euclidean distance between their respective vectors) whereas descriptors of unrelated features are dissimilar (have large Euclidean vector distances). An example of such a descriptor is the SIFT descriptor described in U.S. Pat. No. 6,711,293, titled "Method and apparatus for identifying scale invariant features in an image and use of same for locating an object in an image", incorporated herein by reference in its entirety. Another example is the SURF descriptor described in Luc Van Gool, "SURF: Speeded Up Robust Features", Proceedings of the ninth European Conference on Computer Vision, May 2006.

2) searching a database of object models, to find nearest-neighbors (the most similar features) for each geometric point feature in the image, where:
   2.a) each geometric point feature in the database references the model that it came from, as well as the feature's descriptor, scale, orientation and position within the model image 3) Voting for each potential matching model, using the information from each matching nearest-neighbor feature, where:
   3.a) Each nearest neighbor generates a vote for a particular model with a particular change in scale, orientation and translation.
   3.b) The votes are stored using a generalized Hough Transform, so that votes with the same model and similar relative scale, orientation and translation are grouped together 4) Further analyzing the models with the largest number of votes, by verifying the geometric consistency of the voting feature pairs, where:
   4.a) a geometric transform is estimated that minimizes the projection error of all the matching model geometric point feature coordinates to the coordinates of the geometric point features of the image. The transformation can be, for example, an affinity (affine transform), homography, or an epipolar transform (as described in "Multiple View Geometry in Computer Vision", by R. Hartley and A. Zisserman, Cambridge University Press, 2000). Only models with an accurate geometric transformation are kept.

5) Further verifying the remaining models by measuring the pixel-based similarity, where:
   5.a) A stored image of the matching model is transformed using the accurately calculated geometric transformation, and then a normalized image correlation computation is performed to measure the (normalized) pixel intensity correlation. Only models with a high enough correlation value are kept, or the correlation value can be used as a measure of the quality of the recognition. Other measures of recognition quality are possible, such as a function of the number of matching features in the recognition, the accuracy of the geometric transformation (typically measured as the root-mean-squared error of transformed model coordinates to matching feature coordinates), the area of an image or model covered by matching features, or other properties of a recognition or image correlation.

Before proceeding further with the description of FIG. 1, it should be noted that, in some embodiments, the image acquisition module (110) can include a subsystem for illumination (lighting system). The illumination may be used to guarantee that images of items are of sufficient contrast and brightness to enable visual object recognition. One such example of a system is described in U.S. patent application Ser. No. 11/325,095, filed Jan. 4, 2006, titled "Adaptive Illumination System and Method", incorporated herein by reference in its entirety. The lighting system may also be used for detecting items, as part of a background/foreground segmentation that uses pairs of lit/unlit images to distinguish foreground from background objects.

Image capture occurring in image acquisition module (110) can also be based on a signal from the barcode scanner (102) (see broken line connecting element 102 with element 110 in FIG. 1) when an item is successfully scanned (this can help in the UPC substitution fraud case), or a signal provided by the scanner (102) when the laser beam of the scanner is broken (the scanner detects an item within its scanning area). Triggers can also be generated by activation of a light sensor, or an IR sensor, or via a background subtraction algorithm that can detect foreground objects. For example, one way to do so is by taking two images in quick succession, one with active illumination, and another without, and noticing which regions of the image light up when the difference of the two images is compared.

The image captured through image acquisition module (110) is processed by the object recognition module (103), which compares the image data to a visual recognition model database (104) of item information about known items, and determines the identity of the item or items in the image, if any. In particular, the object recognition module (103) receives images from one or more image acquisition modules (110, 110') and performs a visual recognition of any number of items present in an image. This feature can be useful for a particular kind of sweethearting, where multiple items are carried across the scanner but only one is scanned. Visual recognition can be performed by comparing geometric point features of the image to those stored in database (104). In some embodiments, object recognition module (103) can comprise a feature extractor (112), which generates a list of geometric point features present in even just a single image. See, for example, U.S. Pat. No. 6,711,293, which is incorporated herein by reference in its entirety.

In an exemplary embodiment, the visual recognition model database (104) contains the set of all computed geometric point features (including such information as feature coordinates, orientation, scale, and descriptor) for one or more items to be recognized. Database (104) can also contain an image of the object or items, for the computation of normalized correlation.

According to an embodiment of the present disclosure, the visual recognition model database (104) also contains UPCs corresponding to objects or items whose features are contained in the database. Once one or more items of the database (104) are recognized, the UPCs corresponding to the recognized item or items are sent through connection (109) to the exception analysis module or comparison component (108).

While processing the images of the objects through modules (103) and (110), system (100) also captures the stream of scanned item UPCs from the barcode scanner (102), as well as manually keyed in entries (see UPC entry keyboard (106), which is generally used for identifying items without a barcode or items that cannot conveniently be scanned with the bi-optic scanner) and data from any connected hand-held scanner (107).

Since scans done with a hand-held scanner (and possibly also keyboard entries) may be more difficult to pair with visual recognitions (because the item is not scanned in the view of one of the cameras, for example), according to some embodiments of the present disclosure, the system (100) keeps track of the source of the UPC, i.e., the device from which the UPC was acquired. In this way, the decision process for detecting fraud can take into account the likelihood of items scanned with each source being imaged, and adjust a suspicion level associated with the event accordingly.

In order to compare the scanned UPCs with the captured images of the objects, the system (100) includes an exception analysis module or comparison component (108). If there is a discrepancy between the sequence (105) of scanned UPCs and the sequence (109) of UPCs corresponding to visually recognized items, an exception has been detected and one of several possible actions can be executed.

If only the contents of a transaction (without order) were available, then only a batch of recognitions and a batch of items would be present. This could cause the exception module to make poor reconciliation decisions. Therefore, the order of items in a transaction is also helpful because it gives granular information that is useful for reconciling scanned items and recognitions. By knowing the order of items scanned, one can use a series of recognitions more wisely. For example, if every scanned item in a transaction lines up exactly with every recognized item except for one in the middle (either a missing scan or a missing recognition), one can quickly pinpoint when the missing scan or recognition occurred.

Moreover, if desired, in order to help comparison, a timestamp can be associated to the UPCs sent through connection (105) and the UPCs sent through connection (109).

In particular, the exception analysis module (108) aggregates information from the barcode scanners (bi-optic (102), hand-held (107), and manually keyed entries (106)) on one side and visual recognitions (101, 110) on the other side to determine whether some sort of retail fraud (such as scan passing, sweethearting, or UPC substitution fraud) or accidental retail loss has occurred. The processing can be done identifier by identifier (continuous analysis), or between sets of identifiers as a whole (batch mode) once an entire transaction is completed (or near completion). The system according to the present disclosure allows, for example, a processing that deals with the zero, one or more scans that occur for each visually persistent item. When an exception (fraud/loss) is detected, such exception can either be alerted immediately or in real-time, via an alert module (114), or at a scheduled interval via a reporting module (115).

The alert module (114) receives exception information (including for instance cashier name/identifier, date, time and register number, item lost, image with visual recognition, type of exception/fraud/loss) from the exception analysis module (108) and sends such information in real-time to one or more alert recipients.

The recipients of the information sent by the alert module (114) may include: i) The POS (Point of Sale, cash register) (116), which can display an audio or visual alert (including an image of the visually recognized item), and may or may not be locked from further processing of the customer transaction until the cashier or a manager corrects the exception; ii) another visual display (117) (or audio element) on the checkout stand; iii) a text pager (118), to alert a manager without disturbing the cashier or interfering directly with the transaction. Likewise, a manager can be alerted via a mobile device, e.g., cell phone (119) or a portable (or desktop) email client (120).

The Point of Sale (116) of FIG. 1 is the apparatus that the cashier uses to list items to be transacted, e.g. purchased, display totals and subtotals, and receive payment from the customer. The POS (116) can connect to the exception analysis module (108) and relay to such module all scanned barcodes received from the bi-optic scanner (102), hand-held scanners (107), or the UPC entry keyboard (106). See sequence (105). The sequence (105) of scanned UPCs is matched with a UPC database (113). Database (113) contains a list of all items in a store, their names, manufacture information, UPC identifier, as well as pricing information. Pricing information can be useful, for example, when it is desired that a discrepancy is reported only if such discrepancy is related to an item having a price above a certain threshold.

The POS (116) can also transmit start and end transaction events to the exception analysis module (108), so as to enable that module and the alert (114) and reporting (115) modules to communicate with the POS (116) in a timely fashion (and group exceptions into the correct transaction).

The POS (116) also serves as an alert delivery mechanism, with the alert module (114) able to send to the POS (116) messages to display alerts (including images from the camera (101) of items that are part of a fraud/loss exception), as well as instructions to lock the POS register until proper clearing of the exception by the cashier and/or manager has occurred.

In accordance with the present disclosure, matching of an image to a database of possible items as performed by object recognition module (103) and visual recognition model database (104) allows an independent method of identifying items and also enables a ring-up of items not scanned. If desired, the list of non-scanned items to be rung-up can be displayed on POS (116).

The reporting module (115) of FIG. 1 receives exception information from the exception analysis module (108) (including cashier name, time, and register number, item lost, image with visual recognition, type of exception/fraud/loss) and compiles all occurring exceptions into a report that can be delivered at scheduled intervals (or alternatively upon request) to a manager or security officer for viewing, via a Web-based report viewer (121) and/or an admin tool (122). By way of example, the report can be viewed in various formats, such as chronologically, or by cashier with highest exception rate, or by largest loss values to facilitate searching and conveying of information. The admin tool (122) enables an administrator, manager, or security officer to adjust parameters affecting the performance of the system. This may include adjusting thresholds for the acceptance of a visual recognition or a normalized correlation verification, or a threshold for the suspicion level to trigger an exception. The admin tool (122) also enables configuring the alert module (114), to control how often alerts are generated, whether or not to send reports to the POS (116), whether or not to interrupt the transaction, whether or not a cashier can process the exception or a manager is required. The admin tool (122) can also configure which devices to send alerts to, the priority of alerts (based, for example on the cashier involved in the exception). Likewise, the admin tool (122) can be used to configure the reporting module (115).

As already mentioned above, in accordance with some embodiments of the present disclosure, the exception detection process may be executed continuously, after each UPC scan and/or image recognition, or it may be executed in batch mode, at the end of the transaction when all items have putatively been scanned and the customer is ready to make the payment.

In the exception detection process, a first set of identifiers (e.g., UPCs) coming from item identifier acquisition devices (102), (106), (107) is compared with a second set of identifiers (e.g., UPCs) obtained by processing images from inputs (101), (101'). Both sets of identifiers have an independent number of entries and can contain no entries, a single entry, or plural entries. For example, the number of entries of the first set can be different from the number of entries of the second set.

The comparison component (108) is able to detect matches or mismatches between the identifiers acquired through the item identifier acquisition devices and the identifiers obtained through the object recognition component or module (103) and is also able to detect absence of identifiers acquired through the item identifier acquisition devices when identifiers obtained through the object recognition component are present.

According to an additional embodiment of the present disclosure, the comparison component (108) is also able to detect absence of identifiers obtained through the object recognition component when identifiers acquired through the identifier acquisition devices are present.

Figure 4:
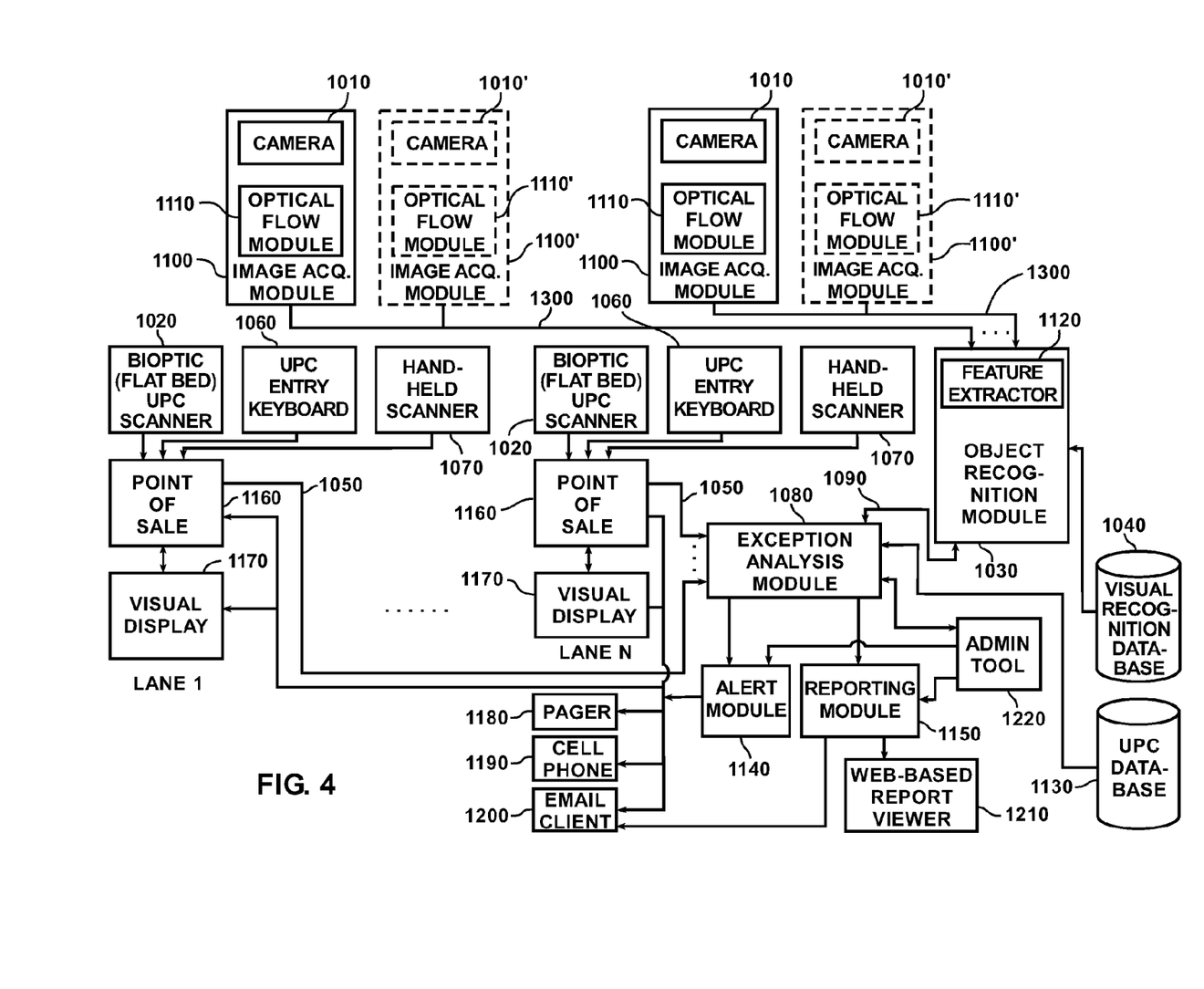
FIG. 4 shows a diagram of the system and method according to the present disclosure in a multi-lane embodiment.

With continued reference to FIG. 4, the right side of the figure shows the remaining components of the system linked to the point of sale (1160) and image acquisition module (1100) of each lane. These components comprise, similarly to what shown in FIG. 1, an object recognition module (1030), an exception analysis module (1080), a visual recognition model database (1040), a UPC database (1030), an admin tool (1220), an alert module (1140), a reporting module (1150), a pager (1180), a cell phone (1190), an email client (1200), and a web-based report viewer (1210). The object recognition module (1030) receives the outputs (1300) of the image acquisition modules (1100) and the outputs (1050) of the various POS (1160). The alert module (1140) can send an alert to the visual displays (1170) of each lane.

Figure 5:
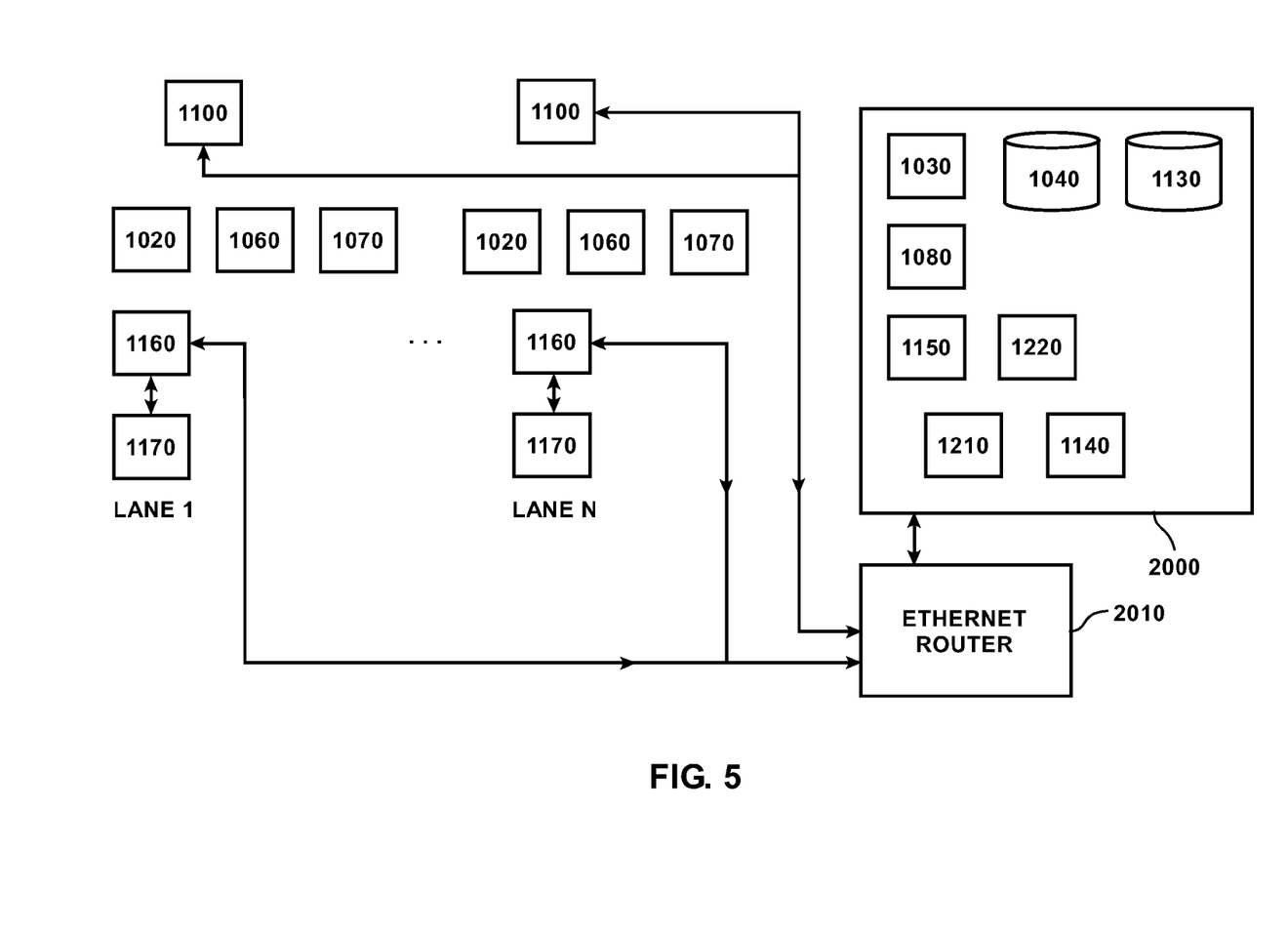
FIG. 5 shows a schematic view of a client-server connection in accordance with the present disclosure.

FIG. 5 shows a server (2000) (e.g., a back office server), containing modules (1030), (1080), (1140), (1150), (1210), (1220) and databases (1040), (1130). According to an embodiment of the present disclosure, modules (1030), (1080), (1140), (1150), (1210), and (1220) can be realized as software, e.g., C/C++ routines and/or algorithms. Ethernet router (2010) connects server (2000) with the image acquisition modules (110), POS (1160) and visual display (1170) of the various lanes.

Possible Detectable Discrepancies (Batch Mode)

As already mentioned above, in accordance with some embodiments of the present disclosure, the exception detection process may be executed continuously, after each UPC scan and/or image recognition, or it may be executed in batch mode, at the end of the transaction when all items have putatively been scanned and the customer is ready to make the payment. In this section an embodiment of batch mode processing is described.

Computational Process for Batch Mode

Figure 6:
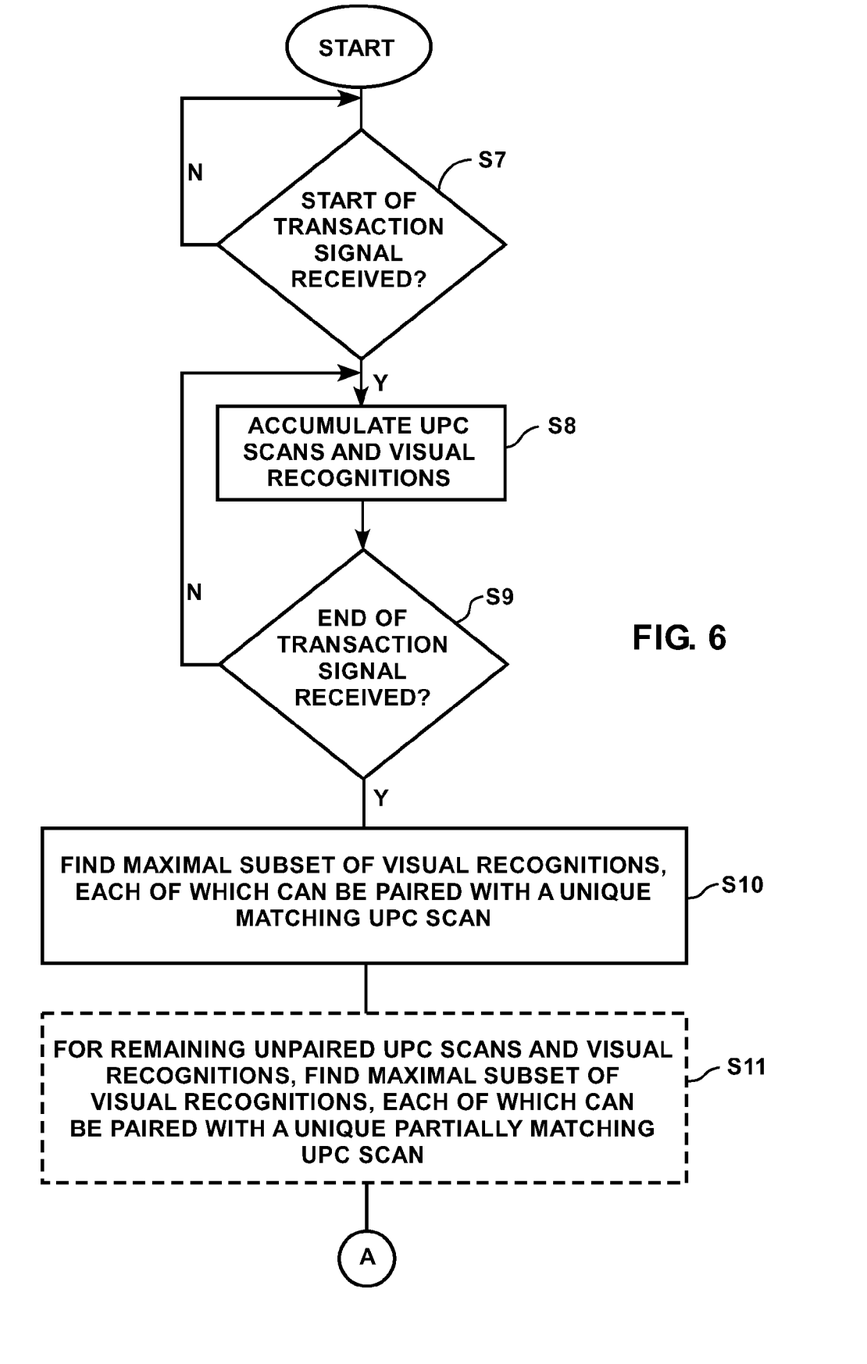
FIG. 6 shows a mode of operation of the system and method of the present disclosure in a batch analysis mode.
Figure 7:
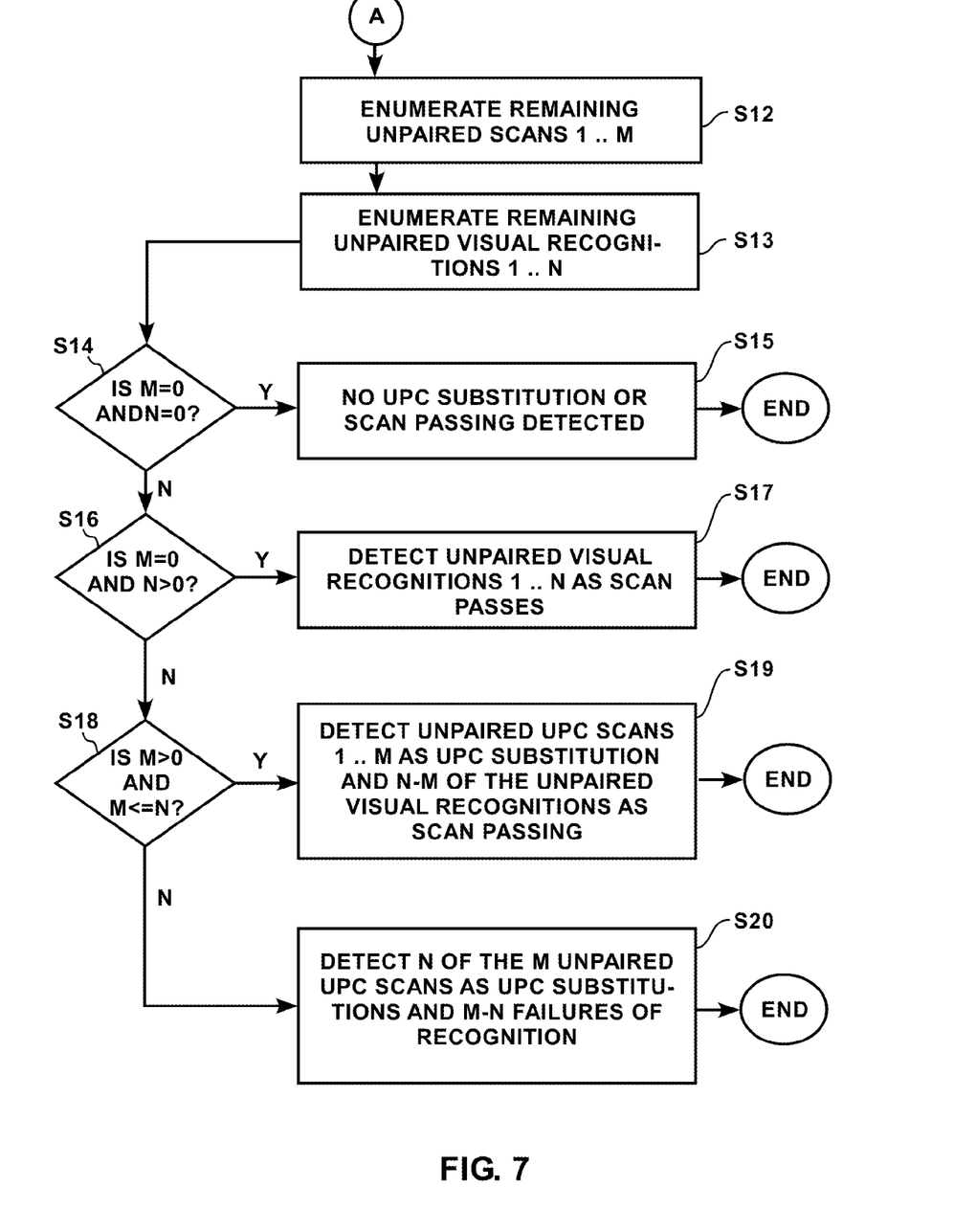
FIG. 7 shows a mode of operation of the system and method of the present disclosure in a batch analysis mode.

FIGS. 6 and 7 depict an embodiment of the computational process for detecting discrepancies between a set of UPC scans and a set of visual recognitions in a batch mode of computation. In steps S7, S8, and S9, the sets of UPC scans and visual recognitions are accumulated for subsequent processing. In step S7, the process waits for a signal to start accumulating UPC scans and visual recognitions. In one embodiment of the invention, this signal is provided by the Point Of Sale (element 116 of FIG. 1) as a consequence of the cashier commencing a new transaction for a customer. In step S8, UPC scans from the UPC acquisition devices (elements 102, 106 and 107 of FIG. 1) connected to the POS (116), as well as the results of visual recognitions pertaining to the one or more image acquisition modules (elements 110, 110' of FIG. 1) in the same checkout lane as the POS (116), are accumulated to form the sets of UPC scans and visual recognitions to process. Step S8 implies (not depicted in FIG. 6) the operation of the image acquisition module (110), feature extractor (112), and object recognition module (103) in order to provide the exception analysis module (108) with the one or more UPC codes corresponding to the one or more items recognized in each image acquired. In step S9 the process waits for a signal to end the accumulation of UPC scans and visual recognitions to form the sets for subsequent processing. In one embodiment, this signal is provided by the POS (116) as a consequence of the cashier pressing a 'Total' button, indicating that all items in the customer's transaction have been putatively transacted (barring the errors or fraud during the transaction). In another embodiment, the batch process is executed periodically (for example, after a certain amount of time elapses, or a certain number of additional UPC scans or visual recognitions received) without requiring a signal, and any resulting detections are updated with each successive re-execution. In this way, when an end-of-transaction signal is received, some of the batch processing computation can be expedited, reducing any potential delay in presenting the detection results at the end of the transaction.

In step S10, an optimization is performed to find the maximal subset of matching visual recognitions and UPC scans. In one embodiment of the disclosure, this is done by iterating over the set of visual recognitions and pairing each with a UPC scan if the UPC code corresponding to the item visually recognized is exactly the same as the UPC code provided by the UPC scan. Each UPC scan would be paired at most once. Step S11 depicts, in some embodiments, an optional step to further extend the subset of matching recognitions and scans by accepting partial scans. A partial scan may, for example, be accepted if the first five digits of the visually recognized and the scanned UPC codes match (the first five digits of a UPC code are unique to a specific manufacturer, so that by comparing them one would confirm that the two UPC codes are from the same product family). Additionally, some embodiments may accept such a partial match of UPC codes only if the price of the items corresponding to the two UPC codes are the same or substantially the same.

Processing then continues with steps S12 and S13 of FIG. 7, where the remaining unpaired UPC scans are enumerated 1 to M, and the remaining unpaired visual recognitions are enumerated 1 to N. Depending on the values of M and N, different types and combinations of fraud can be detected, and processed accordingly by the alert module (114) and reporting module (115). The possible cases to consider are:

i) if M=0 and N=0, then all items were properly scanned (steps S14 and S16 of FIG. 7).

ii) If M=0 and N>0, then the N unpaired visual recognitions are detected as potential scan passes (S16 and S17).

iii) if M>0 and M<=N, then the M unpaired UPC scans are detected as potential UPC substitutions, and N-M of the unpaired visual recognitions are detected as potential scan passes (steps S18 and S19).

iv) if none of the above three cases occur, then (at least) N of the unpaired UPC scans are detected as potential UPC substitutions, and there were also M-N failures to obtain a visual recognition (step S20). The frequency of occurrence of failures to obtain visual recognition when they are expected may be monitored for all items collectively, and/or for each cashier, and an alert or report generated if the frequency exceeds a threshold, indicating that the image acquisition module may be blocked from acquiring images, or a specific cashier is impairing the image acquisition process, respectively.

It should be noted that in some of the above cases, without the use of timing information (that is, timestamps for the UPC scans and image acquisitions), it could be difficult to determine which, say, of the N-M out of N unpaired visual recognitions correspond to the scan passes, even though the occurrence of scan passing is determined with high confidence. By incorporating timing information (either to further constrain the possible pairing of UPC scans and visual recognitions, or as part of a Hidden Markov Model process or a Dynamic Time Warping process as detailed below), a more detailed detection and determination of fraud is possible.

In some embodiments of the present disclosure, the previously discussed database (104) of items used for visual recognition may not contain all the items in the store, but a subset or predetermined class (e.g., the most frequently transacted/purchased items, high value items, the items with highest loss rate, or any other list the retailer may desire). In this case one would not expect a visual recognition of items not in the database (104), and those unpaired UPC scans can be discounted from the number of unpaired UPCs, M, mentioned above.

During the normal scanning process executed by a cashier, multiple images of an item may be captured, generating more than one visual recognition of the same item. These multiple recognitions can be considered by the system (100) as being equivalent to a single recognition of the item and thus counted as a single visual recognition. One way to collapse multiple recognitions into one equivalent recognition is to ignore subsequent identical recognitions. Another way (as previously mentioned), is to have the image acquisition module (110, 110') explicitly label images as being observations of the same physical item.

According to some embodiments of the present disclosure, a generic item detection (GID) algorithm can be used to visually detect an item with a high degree of confidence without identifying the item specifically. One such method of generic item detection is described in U.S. patent application Ser. No. 11/811,211, filed Jun. 8, 2007, titled "System and method for detecting generic items in an image sequence", and incorporated herein by reference in its entirety. This could allow keeping track of items not in the database (104) and monitoring such items for scan passing instead of just ignoring them during the pairing process.

Other possible GID methods can include one or more of the following: a visual object class classifier, similar to that used in the GID system of U.S. patent application Ser. No. 11/811,211, but without motion constraints; a stereo camera system to detect position/shape of items; an RFID tag on valuable items (e.g., the inexpensive kind that just sets off a sensor without identifying the product, typically used at store exits), tuned to detect items passing by the barcode scanner; a photodiode brightness signal, or an IR sensor, or other similar sensor to detect an item nearby the scanner; an UPC scanner laser beam interruption signal (even if no UPC has been successfully scanned); a background subtraction for foreground detection, using lit/unlit image pairs.

Possible Detectable Discrepancies (Continuous Analysis)

According to a further embodiment of the present disclosure, since item scanning occurs sequentially, it is possible to monitor the process for possible exceptions as the scanning occurs, rather than in batch mode at the end of the transaction.

The expected result is the observation of an intertwined sequence of UPC scans (105) and visual recognitions (109). In particular, the expectation is that of seeing a sequential pairing of a UPC scan (105) and a visual recognition (109), although the order of which appears first can vary, and there may be more than one visual recognition for each UPC scan, as already mentioned above.

Computational Process for Continuous Analysis

Figure 2:
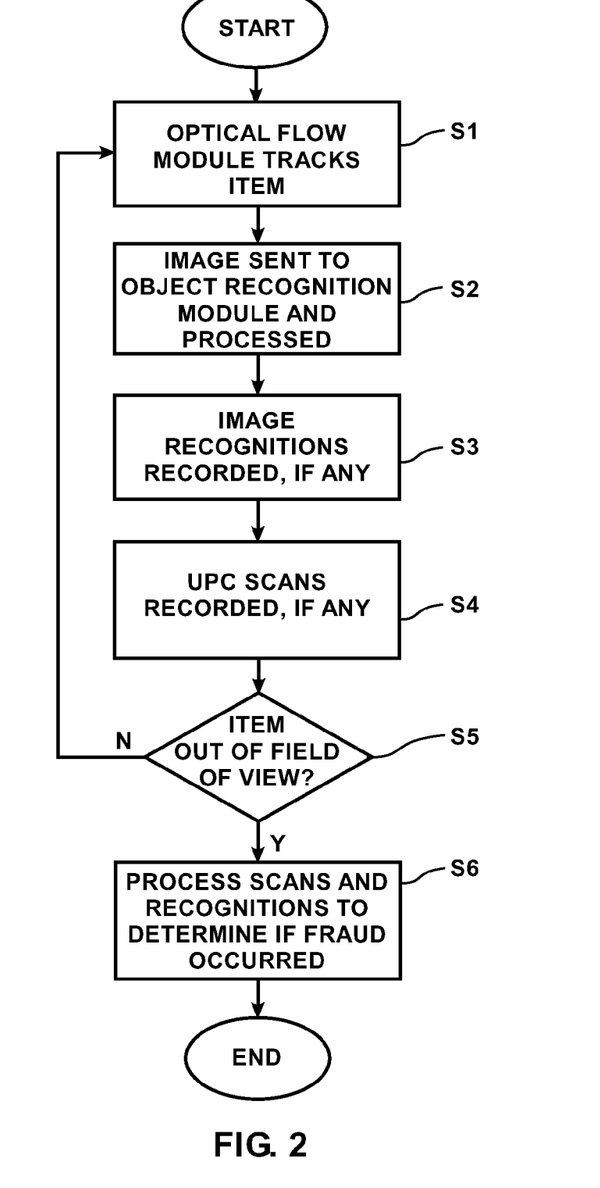
FIG. 2 shows a mode of operation of the system and method of the present disclosure in a continuous analysis mode.

Partition the sequence of images and barcode scans by tracking individual items as they enter and persist within the imaged area. Reference can be made to FIG. 2 of the present application, where the steps for real-time processing of an item are shown.

Partitioning can be done by tracking features or image sub-blocks with optical flow, or by tracking a visual blob. During the time within which a (potential) item is in view, zero, one, or multiple visual recognitions may occur, and zero, one, or multiple UPC scans may occur.

In particular, as shown in FIG. 2, comparison (step S6) between recorded image recognitions (step S3) and recorded scans (step S4) occurs only when the item is out of the field of view (step S5).

Once an item ceases to persist within the imaged area, the visual recognitions and UPC scans that occurred can be processed to check for fraud or loss, according, for example, to the following rules:

i) if a UPC scan occurs, check for UPC substitution fraud by comparing to the visual recognition(s);

ii) if multiple UPC scans occur the cashier may be using one item to quickly scan in a batch of identical items or the cashier may have accidentally duplicated a charge. Count of the repeated scans can be kept, then the repeated scans can be used to account for subsequent identical items that pass by without a scan;

iii) if no UPC scan occurs (and there was at least one visual recognition), then scan passing has occurred, unless there is a recent matching extra scan from a multiply scanned item;

iv) if there is a UPC scan but no recognitions, then there are two cases to consider:

iv.a) if the UPC is one represented in the visual recognition database, then UPC substitution may have occurred, or perhaps the item was not recognized successfully due to a poor view of the item. To distinguish the two instances, statistics of how likely each item of the database is likely to be visually recognized can be built up, and then the suspicion level can be adjusted accordingly whenever the item is scanned but not recognized. Suspicion levels can also be maintained for all items collectively, and for each individual cashier. These suspicion levels, respectively, can provide an indication that the image acquisition module is no longer able to acquire valid images (due to an obstruction, perhaps), or that an individual cashier is (perhaps purposefully) impairing the image acquisition process, avoiding the items to be imaged.

iv.b) If however the UPC does not pertain to an item in the visual recognition database, then it can be ignored. Alternatively if a generic item detector is used and it generates a visual detection, then the UPC can still be accounted for with the visual detection, although the specific identity of the item cannot be confirmed and verified;

v) if the UPC is not in the visual recognition database, but a visual recognition occurs, then UPC substitution is likely.

According to a further embodiment of the present disclosure, if visual recognition does not have a high enough confidence level, scan pass and UPC fraud can be checked at the manufacture level (that is, the brand or manufacturer of an item can be more reliably recognized than the specific item). If the scan and the visual recognition (the latter occurring without needing the UPC barcode to be visible) are of different brands or manufacturers, there is certainty of UPC fraud, for instance. If they are from the same manufacturer or brand one can also vary a "suspicion level" of the potential fraud based on the value of the scanned item and/or visual recognition, so that the reporting of detected differences between scanned or keyed-in identifiers (e.g., UPCs) and identifiers of the acquired images is based on the fraud suspicion level. A visual recognition can also be done by recognizing specific logos or subset of features (e.g., UPC barcode) that are common to a subset of the items in the database, and knowing that a particular item should belong to such a subset of database items.

In the following paragraphs, additional ways of dealing with exceptions will be discussed. Such additional ways include real-time options and post-event handling.

Real Time Options

The cashier can be alerted as soon as UPC fraud or scan passing is detected according to one or more of the following options: i) generate an auditory or visual alert executed on bi-optic (flat-bed scanner) and/or POS (cash register); or ii) suspend the transaction, e.g., lock up the bi-optic scanner and/or POS until exception is corrected by the cashier and/or a manager. The alert and/or lock-up can include the display of the image of the detected item on the POS display or other display device.

Alternatively, the cashier can be alerted at the end of the transaction (and/or when the "Total" or "Cash" button is pressed on the POS by the cashier), using the same alert/lock options as mentioned above.

The store manager and/or store security can be alerted, by use of a pager and/or text message and/or automated cell phone call and/or email. The decision to send an alert may be based on the estimated monetary value of the fraud exceeding a threshold. One can also keep a running total of fraud related loss for each cashier (on an hourly, daily, weekly, or perpetual basis) and alert a manager and/or security and/or loss prevention department when a threshold for the period has been exceeded.

It should be noted that depending on the probable cause for the exceptions, a store may or may not want to alert the cashier in real-time. In other words, if the cause of scan passing or UPC substitution is due to the cashier colluding with a customer, then it may be best not to alert the cashier directly, but instead the manager (or other entity). Alerting the cashier directly may only serve to train him better how to evade detection. If, on the other hand, scan passing exceptions occur due to an accidental failure to scan an item, or UPC substitution occurs due to a customer's solitary attempt to defraud the retailer, then it may be advantageous to alert the cashier directly and avoid the retail loss immediately.

Post-Event Exception Handling (Reporting)

A report can be sent to a manager and/or security and/or loss prevention department and/or other entities summarizing the performance of each cashier for the specified reporting period (for example, hourly reports, or daily, weekly, monthly).

The system could highlight cashiers with high loss rates, and could include a list of detected exceptions, noting the time of occurrence, lane number, type of exception, item description, and a detected image of the suspect item, with the item highlighted (outlined) in the image. Each exception could also be linked to video from a store's surveillance system, as also shown in FIG. 1 by the arrow connecting module (110) with module (108). The linking could include downloading video to include in the report, or creating a timestamp event within the surveillance system.

The system could recommend shortening the report period for those cashiers with high loss rates and/or enable real-time manager alerts.

The reports (and the real-time alerts of the previous section) can be customized for each cashier (for example, new cashiers, or cashiers under suspicion of misbehaving, are monitored with higher frequency) or for each store (some areas may be more prone to fraud than others).

Reports (and the alerts of the previous section) can also be customized based on the type and/or quantity of fraud.

In the following paragraphs, additional embodiments of the present disclosure will be discussed.

Estimating and Monitoring a "Suspicion Level" to Trigger Exception Alerts and/or Reports In most cases, determining whether or not an exception has occurred is clear cut and unambiguous (such as when a visual recognition occurs and there is no corresponding UPC scan), and the exception can be generated immediately. In other cases (such as when a UPC of an item in the visual database is scanned, but the item is not visually recognized—either because of a) fraud: UPC substitution fraud, or instead b) no fraud: the correct item was not imaged sufficiently well) one cannot ascertain whether an exception occurred with complete certainty. For the latter case, it is advantageous to keep track of a suspicion level. This level is incremented proportionally to the confidence or likelihood that an exception occurred, and when over time and several incidents the level reaches or exceeds a predetermined level an alert or reporting action can be executed.

Some exemplary uses of a suspicion level are as follows:

i) a suspicion level can be tracked (and then reset) for each transaction, or for a predefined time period to monitor each cashier (an hour, day, week, etc).

ii) when a suspicion level reaches a predefined threshold and an alert/report action is executed, the suspicion level can be reset to zero to begin accumulating evidence of suspicious activity anew.

iii) when an exception is triggered, all of the incidents which had caused a suspicion level increment above a predetermined level can be included as part of the alert or report.

iv) for the case where a UPC of an item in the visual recognition database is scanned, but no visual recognition occurs, to distinguish between UPC substitution fraud (another item not in the database had the incorrect UPC barcode on it) and a visual recognition failure (a suboptimal view of the item made the recognition difficult), the system could learn a statistical model (from numerous previous observed scans) of how likely the item is to be recognized. For items that are typically recognized with a very high quality recognition, the suspicion level increment would be quite large when a recognition was not obtained. For items which frequently do not have a recognition (because their packaging is not as amenable to recognition), the failure to recognize would incur only a small suspicion level increment.

v) some items may be difficult to recognize, because, for example they are similar and confusable with other items. In these cases, a visual recognition computation may result in not just a single answer, but many possible results. This makes the determination of whether or not UPC substitution has occurred or not more difficult. However, by learning a statistical model of what recognition results typically arise for each item, the system is able to determine if any particular set of recognition results is typical or not, and assign the recognition either a low or a high suspicion level, respectively.

vi) the suspicion level can be estimated as a continuous valued function, based, say, on a continuous probabilistic model, or it can be estimated at discrete values.

vii) the estimated suspicion level of the processing of an item can also take into account the price of the item as it was scanned and/or visually recognized; suspicious activity with low priced items may incur a low suspicion level increment, whereas similar activity with high priced items may incur a larger suspicion level increment.

viii) items processed without a visual recognition but with a generic item detection instead may cause an increment (or not) of the suspicion level, instead of an outright decision as to whether an exception has occurred or not.

How to Distinguish True UPC Substitution Fraud from Recognition Errors Due to Packaging Changes If an item packaging changes, one may no longer be able to recognize it properly. However, if the value of the visually recognized item is much higher than the value of the UPC scanned, fraud is very likely. Additionally, if the same UPC has had misrecognitions in other lanes recently, fraud is less likely, and a packaging change is more likely.

One can also monitor for UPC substitution at the manufacturer or brand level instead of individual item level. In other words, the comparison component (108) can qualify a mismatch between partially matching identifiers as a match. Although this would reduce the fraction of UPC substitution loss that is caught (it would only be detected when the UPC of a different brand or manufacturer was used), it would make the system more robust to packaging changes, because brands and manufacturers can be reliably recognized irrespective of whether or not a packaging change occurs.

Alternatively, one can, for each item to be recognized (or those for which it is deemed necessary), generate a list of items that it may be misrecognized as, and then discount any possible UPC substitution fraud if the item is recognized as one of the items on its list. The list can be generated automatically by doing automated comparisons of the items in the visual recognition database, and automatically selecting the most similar items.

One can monitor the statistics of the recognition quality and frequency for each particular UPC, and if there is a point in time after which the recognition quality is consistently degraded or recognition frequency reduced, then it is highly likely that a packaging change occurred.

Alerting for Visual Recognition Database Maintenance

The monitoring of the item recognition statistics mentioned above may be used to alert the store that a package change occurred and a recognition model needs to be updated.

Automatic Updating of the Visual Recognition Database

If desired, the images associated with a UPC during UPC fraud exceptions can be used to generate a new visual recognition database model automatically (statistically, over many observations).

In the following paragraphs, other methods of batch mode processing will be discussed.

Hidden Markov Model

A Hidden Markov Model and/or Dynamic Time Warping can be used to more accurately pair UPC scans with recognitions, since this will take into account timing information and the sequential nature of the measurements (scans and visual recognitions).

This may be better than just counting/pairing UPCs and recognitions without taking into account timing and sequential nature.

A Hidden Markov Model may use such information as the timestamps of the occurrence of visual recognitions and UPC scans the source of a UPC scan (whether it came from the bi-optic/flat-bed scanner, a hand-held scanner, a manually keyed entry or other source)

a group ID tag (provided by the optical flow/tracker) for each visual recognition and UPC scan to indicate that it occurred during the cashier's processing of the same, single physical item.

the centroid and size of the item tracked by optical flow (either in the images used for visual recognition, or throughout the entire high frame rate used for tracking)

a statistical model of the typical time sequence behavior of scans and recognitions during a normal scan (which can be modeled for each cashier individually)

statistical models of other scanning behaviors (such as using the same item to scan in multiple identical items, accidental failure to scan an item, accidental double scanning of an item, purposeful scan passing, purposeful or accidental UPC substitution).

Selective Processing of Images for Computational Efficiency

Since a single server in a store may be used to perform visual recognitions for all lanes, and each recognition may involve a substantial amount of computation, it may be advantageous to selectively perform visual recognitions, to reduce the risk of overloading the server.

Given that the object recognition module receives a set of images of an item from a lane in quick succession, some exemplary methods of selectively processing the images are:

pick the image with the timestamp closest to the UPC scan timestamp (or with a predetermine offset, if the imager and the scanner are not co-aligned in the checkout lane). If object recognition of that image provides conclusive evidence of fraud or no fraud, the server can avoid processing the rest of the images in that set. If the object recognition does not provide conclusive evidence for or against fraud, then other images are selected for processing (in the form of a binary search of the corresponding time interval, say, so as to sample the time interval from a coarse-to-fine fashion).

a computationally efficient pre-processing step may be used to rank the images for processing. For example, the amount of image area occupied by the foreground object can be measured, or the amount of texture in the foreground can be measured, giving priority to images with higher foreground area or larger amounts of texture.

An alternate embodiment that would also reduce the computational load of a central store-wide server would be to perform some of the computationally expensive steps on a processor within each lane (say, a processor that is part of the image acquisition module (110, 110')). Such steps could include the detection and generation of geometric point features, or the searching of a database (also stored locally, or previously transmitted from the server to the lane upon lane reboot) to find nearest-neighbor features for each geometric point feature of the image (see section on details of the object recognition method below).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A method for detecting discrepancies between first and second sets of merchandise identifiers that correspond to merchandise items to be identified in a retail checkout transaction, the method comprising:
    acquiring encoded information from optical codes borne by at least some of the merchandise items to be identified in the retail checkout transaction, the encoded information corresponding to a first set of merchandise identifiers;
    acquiring images of at least some of the merchandise items to be identified in the retail checkout transaction to obtain scale-invariant visual feature data based on visual appearance of the at least some of the merchandise items;
    comparing the scale-invariant visual feature data with a database of stored scale-invariant visual feature data corresponding to known merchandise items to obtain a second set of merchandise identifiers;
    detecting differences between the first and second sets of merchandise identifiers by comparing presence or absence of merchandise identifiers of the first set of merchandise identifiers with the presence or absence of merchandise identifiers of the second set of merchandise identifiers, in which the comparing is configured to be performed identifier by identifier or between the sets as a whole;
    determining a price difference between merchandise items of the first and second sets; and
    generating, in response to detecting a merchandise identifier of the second set of merchandise identifiers is absent from the first set of merchandise identifiers, transaction information indicating a user responsible for facilitating acquisition of the encoded information has avoided inclusion of a merchandise item in the retail checkout transaction.

2. The method of claim 1, in which the transaction information includes a suspicion level based on a total number or cash value of discrepancies.

3. The method of claim 2, further comprising:
    adjusting a suspicion level in response to a discrepancy detected between the first and second sets of merchandise identifiers.

4. The method of claim 3, in which the step of generating comprises:
    generating an exception in response to the suspicion level exceeding a predetermined threshold level.

5. The method of claim 1, in which the step of generating comprises:
    immediately generating an alert in response to detecting a merchandise identifier of the second set of merchandise identifiers is absent from the first set of merchandise identifiers.

6. The method of claim 5, further comprising:
    providing the alert to store management or security personnel.

7. The method of claim 5, further comprising:
    providing the alert to the user or a customer.

8. The method of claim 1, further comprising:
    suspending the retail checkout transaction in response to detecting a merchandise identifier of the second set of merchandise identifiers is absent from the first set of merchandise identifiers.

9. The method of claim 1, in which the step of generating comprises:
    generating an alert in response to detecting a merchandise identifier of the second set of merchandise identifiers is absent from the first set of merchandise identifiers, and in response to the user indicating no further merchandise items are to be included in the retail checkout transaction.

10. The method of claim 1, in which the optical codes are universal product codes (UPCs).

11. The method of claim 1, in which the scale-invariant visual feature data comprises scale-invariant feature transform (SIFT) features, and in which a merchandise item is represented by a spatial relationship between multiple SIFT features.

12. The method of claim 1, further comprising:
    generating an alert in response to the price difference exceeding a predetermined threshold level.

13. The method of claim 1, further comprising:
adding the price difference to a total of price differences associated with the user.

14. The method of claim 13, further comprising:
generating an alert in response to the total of price differences exceeding a predetermined threshold for a predetermined period.

15. The method of claim 1, in which the first and second sets of merchandise identifiers include universal product code (UPC) numbers.

16. The method of claim 1, in which the optical codes are universal product codes (UPCs), the method further comprising:
generating, in response to detecting a merchandise identifier of the first set of merchandise identifiers being absent from the second set of merchandise identifiers, transaction information indicating a UPC has been substituted.

17. The method of claim 1, further comprising:
generating a report of the transaction information for delivery to store management or security personnel at a predetermined time.

18. A method for detecting discrepancies between first and second sets of merchandise identifiers that correspond to merchandise items to be identified in a retail checkout transaction, the method comprising:
acquiring encoded information from optical codes borne by at least some of the merchandise items to be identified in the retail checkout transaction, the encoded information corresponding to a first set of merchandise identifiers;
acquiring images of at least some of the merchandise items to be identified in the retail checkout transaction to obtain scale-invariant visual feature data based on a physical property of the at least some of the merchandise items;
comparing the scale-invariant visual feature data with a database of stored scale-invariant visual feature data corresponding to known merchandise items to obtain a second set of merchandise identifiers;
detecting a merchandise identifier of the second set of merchandise identifiers as being absent from the first set of merchandise identifiers;
determining a price difference between merchandise items of the first and second sets; and
generating a report indicating a user responsible for facilitating acquisition of the encoded information has avoided inclusion of a merchandise item in the retail checkout transaction.

19. The method of claim 18, further comprising:
providing reports periodically to store management or security personnel.

* * * * *